United States Patent [19]

Bateman et al.

[11] Patent Number: 4,914,436

[45] Date of Patent: Apr. 3, 1990

[54] GROUND PROXIMITY APPROACH WARNING SYSTEM WITHOUT LANDING FLAP INPUT

[75] Inventors: Charles D. Bateman, Bellevue; Michael M. Grove, Snohomish, both of Wash.

[73] Assignee: Sundstrand Data Control, Inc., Redmond, Wash.

[21] Appl. No.: 35,112

[22] Filed: Apr. 6, 1987

[51] Int. Cl.[4] .............................................. G08B 23/00
[52] U.S. Cl. .................................... 340/970; 340/963; 342/389; 364/433
[58] Field of Search .............. 340/961, 963, 970, 979; 364/433, 439, 444, 451, 452; 342/32, 38, 65, 389

[56] References Cited

U.S. PATENT DOCUMENTS

| | | | |
|---|---|---|---|
| 3,308,278 | 3/1967 | Davis et al. | 364/452 |
| 4,061,297 | 12/1977 | Foster | 364/451 |
| 4,224,669 | 9/1980 | Brame | 340/970 |
| 4,428,057 | 1/1984 | Setliff et al. | 364/444 |
| 4,520,445 | 5/1985 | Keearns | 342/65 |
| 4,567,483 | 1/1986 | Bateman et al. | 340/970 |
| 4,646,244 | 2/1987 | Bateman et al. | 340/963 |
| 4,675,823 | 6/1987 | Noland | 340/970 |
| 4,684,948 | 8/1987 | Bateman | 340/970 |

FOREIGN PATENT DOCUMENTS 2132442A 7/1984 United Kingdom ................ 342/389

OTHER PUBLICATIONS

*IFR*, Apr. 1987, vol. 3, No. 4, "IFR Flight with the New Lorans", Jeff Parnau, pp. 1–8.
*Aviation Consumer*, "Loran Database Comparison", Jul. 1, 1987, pp. 9–14.

*Primary Examiner*—Joseph A. Orsino
*Assistant Examiner*—Brent A. Swarthout
*Attorney, Agent, or Firm*—Mason, Kolehmainen, Rathburn & Wyss

[57] ABSTRACT

A ground proximity warning system is disclosed which can recognize when an aircraft is on a final approach to an airport without utilizing a landing flap signal input. Airports together with the surrounding terrain topography are modeled by a simple geometric shape, such as, an inverted truncated cone, and stored on-board the aircraft. The system uses navigational data to determine the distance of the aircraft from the geometric model. Once the aircraft is determined to be within the area defined by the geometric model, the system provides an enabling envelope indicative that the aircraft is on a final approach for enabling various ground proximity warning systems. Also disclosed is a system for altering the enabling envelope as a function of the aircraft's alignment with a particular runway.

5 Claims, 2 Drawing Sheets

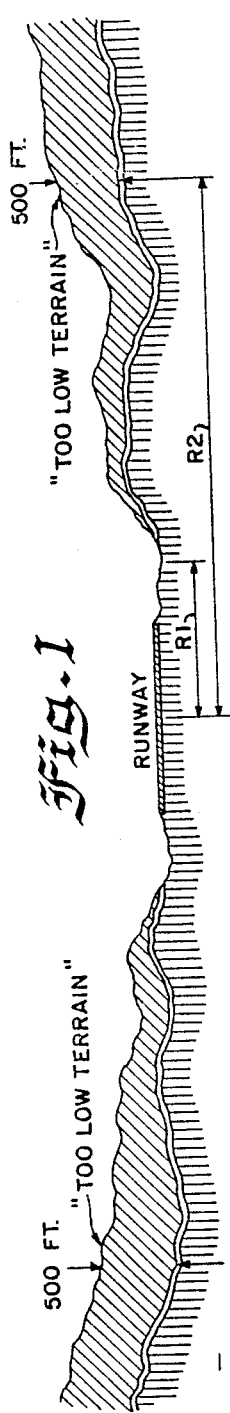
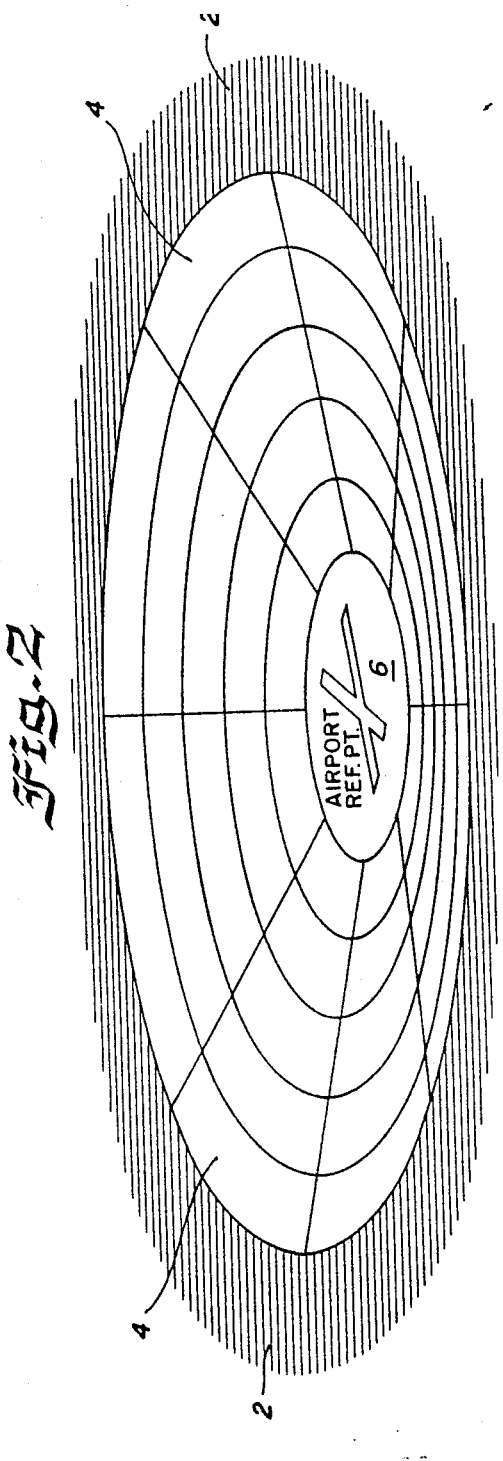
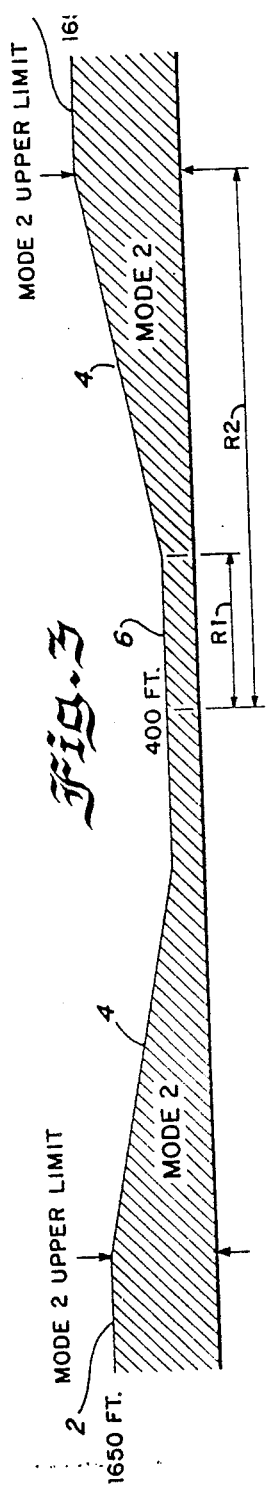

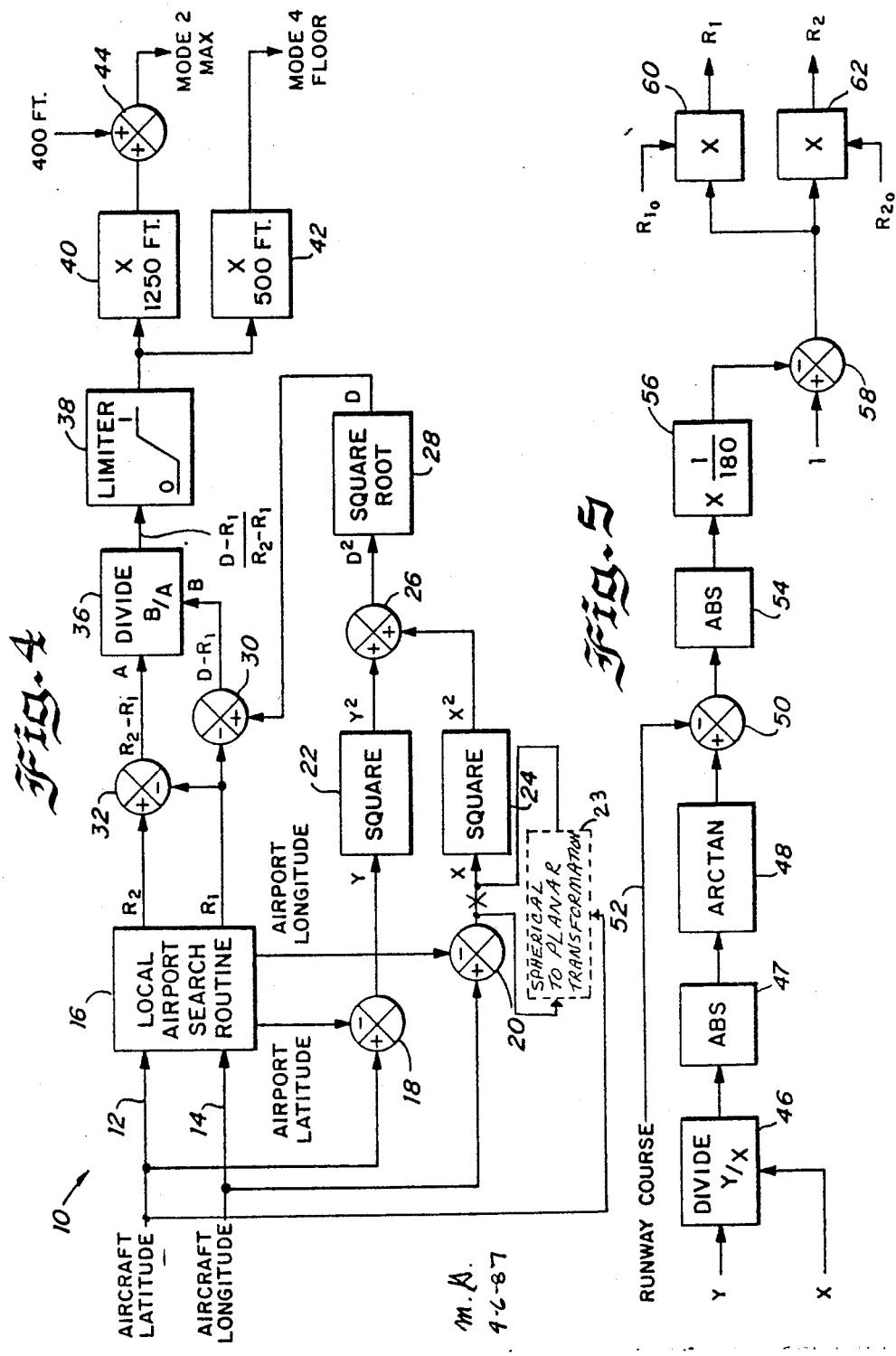

GROUND PROXIMITY APPROACH WARNING SYSTEM WITHOUT LANDING FLAP INPUT

BACKGROUND OF THE INVENTION

1. Field of the Invention

This invention generally relates to a system for enabling an aircraft ground proximity warning system when an aircraft is on a final approach and, more particularly, to a system for providing an enabling envelope when an aircraft is on a final approach to an airport without the use of a flap position input signal.

2. Description of the Prior Art

Various systems are known that provide warning or advisory indications in the event of hazardous flight conditions. Among such systems are systems generally known as ground proximity warning systems for aircraft that serve to monitor the flight conditions of an aircraft and provide a warning if flight conditions are such that an inadvertent contact with the ground is imminent. Among the flight conditions monitored by such systems are radio altitude and rate, barometric altitude and rate, airspeed and flap and gear positions. The aforementioned parameters are monitored and an advisory indication or warning is generated when the relationship between the aforementioned conditions or parameters are such that a ground impact is likely to occur. Typical examples of such systems are disclosed in U.S. Pat. Nos. 3,715,718; 3,936,796; 3,958,218; 3,944,968; 3,947,808; 3,947,810; 3,934,221; 3,958,219; 3,925,751; 3,934,222; 4,060,793; 4,030,065; 4,215,334; 4,319,218, all assigned to the same assignee as the assignee of the present invention.

The above-described systems provide an advisory warning in the event of a hazardous flight condition. However, in optimizing the design of the warning criteria, it is difficult to arrive at warning criteria suitable for all phases of flight. In particular, it is desirable to alter the warning criteria in certain situations, such as, during a final approach phase, to reduce nuisance warnings. Several prior art systems utilize signals representative of aircraft configuration to control the alteration of the warning criteria when the aircraft is on a final approach.

In such configuration responsive systems, signals, such as, flap and gear position, are used to represent that an aircraft is on a final approach to an airport. In such systems, a 40° flap position was used to indicate that the aircraft was on a final approach to an airport. The 40° flap setting was used because it was a unique flap setting that was only used when an aircraft was on a final approach. However, certain newer aircraft now use a 20° flap setting during the final approach, a setting that may be used during various phases of flight and not just final approach. This precludes the use of a flap position signal as an indication that the aircraft is on a final approach, because there is no way of distinguishing a 20° flap setting used on final approach from a 20° flap setting used in a different phase of flight.

SUMMARY OF THE INVENTION

Thus, it is an object of the present invention to provide a warning system that overcomes many of the disadvantages of the prior art systems.

It is another object of the present invention to provide a means for detecting whether an aircraft is on a final approach to an airport without the use of a flap position signal.

It is yet another object of the invention to provide a means for detecting the proximity of an aircraft to a particular airport without utilizing a substantial amount of memory on board the aircraft.

It is another object of the invention to provide an enabling envelope for enabling various warning systems based upon the position of the aircraft relative to the airport.

In accordance with the preferred embodiment of the invention a system is disclosed for generating an enabling envelope for enabling various warning systems when an aircraft is on a final approach to an airport. Specifically, individual airports, together with contiguous terrain topography, are modeled by a simple geometric shape, such as, a truncated inverted cone, defined by its centerpoint latitude and longitude coordinates, a radius $R_1$, which is the radius of the smallest circular cross-section of the cone, and a radius $R_2$, which is the radius of the largest circular cross-section of the cone. The present coordinates of the aircraft are compared with the coordinates for each airport as modeled by the cone. The system locates the nearest airport and then determines the distance between the aircraft and the airport. When the aircraft enters the area modeled by the cone, the system generates an enabling envelope which indicates that the aircraft is on a final approach to an airport. The system is also capable of determining the alignment of the aircraft with respect to a particular runway and altering the enabling envelope accordingly.

DESCRIPTION OF THE DRAWING

These and other objects and advantages of the present invention will become readily apparent upon consideration of the following detailed description and attached drawing, wherein:

FIG. 1 is an elevational view of a typical airport showing surrounding terrain topography;

FIG. 2 is a perspective view of an inverted truncated cone used to model an airport and surrounding terrain topography in accordance with the present invention;

FIG. 3 is an enabling envelope for a Mode 2 warning in accordance with the present invention;

FIG. 4 is a functional block diagram of a system for providing an enabling envelope for a ground proximity warning system in accordance with the present invention; and FIG. 5 is a functional block diagram of a system for determining the alignment of the aircraft with respect to a particular runway in accordance with the present invention.

DETAILED DESCRIPTION OF THE DRAWING

Referring to the drawing, and in particular FIG. 1, there is illustrated an elevational view of a typical airport with the topography of the surrounding terrain shown. For various airports around the world, the topography of the terrain surrounding the airport will vary substantially. However, as will be described in more detail below, each airport and its surrounding topography can be modeled by a simple geometric shape, such as, an inverted truncated cone. The system in accordance with the present invention determines the distance of the aircraft from the geometric shape to provide an indication when the aircraft is on a final approach.

The cone is defined by the latitude and longitude coordinates of its centerpoint and the radii $R_1$ and $R_2$. Referring to FIG. 2, the radius $R_1$ corresponds to the radius of the smallest circular cross section of the cone used to represent the terrain surrounding the airport. The radius $R_2$ corresponds to the radius of the largest circular cross section of the cone used to represent the terrain surrounding the airport that may contain hazardous obstacles. The concentric circles, illustrated in FIG. 2, illustrate an important feature of the invention. They illustrate that the radii $R_1$ and $R_2$ are selectable. Generally, by scaling the radii $R_1$ and $R_2$, the contour of the enabling envelope can be altered. This aspect of the invention will be described in more detail below. It should be understood that the invention is not limited to an inverted truncated cone. Other geometric shapes could also be used.

FIG. 3 illustrates an enabling envelope for a Mode 2 (Terrain Closure) warning system. Mode 2 warnings are known in the art and provide an indication to the pilot of an aircraft if the clearance between the terrain and the aircraft is decreasing at a relatively high rate as a function of the aircraft's altitude above ground. An example of a conventional Mode 2 warning system is disclosed in U.S. Pat. No. 3,958,219 to Bateman et al, which is assigned to the same assignee as the assignee of the present invention.

In conventional warning systems, the warning criteria may be altered during certain phases of flight, such as a final approach phase, to reduce or eliminate nuisance warnings. Certain prior art warning systems utilized a flap position signal to indicate that an aircraft was on a final approach to an airport. However, since flap position is no longer unique to a particular phase of flight for certain newer aircraft, the system in accordance with the present invention provides an envelope for enabling various warning systems when the aircraft is in a final approach phase of flight without using flap or gear position signals. Whenever the aircraft is within the boundaries of the envelope, various ground proximity warning systems, such as, Mode 2 and Mode 4 warning systems, can be enabled.

The Mode 2 warning envelope is shown as an example only. The system in accordance with the present invention may also be used to enable other warning modes and even used in control systems. Referring to FIG. 3, line 6 represents the lower limit of an enabling envelope. As shown, a limit of 400 feet is shown for illustration purposes; however, other limits could also be used. The lower limit is used when the aircraft is within a circle defined by radius $R_1$. The lines 2 represent the upper limit of the warning envelope which, for example, is illustrated as 1650 feet. The upper limit is applicable when the aircraft is at a distance from the airport equal to or greater than radius $R_2$. When the aircraft is at a distance from the airport equal to or less than $R_2$, an enabling envelope is generated indicating that the aircraft is on its final approach. When the aircraft is within the circular area between $R_2$ and $R_1$, the enabling envelope slopes as shown in FIG. 3 and is a function of the distance to $R_1$. This is illustrated by the lines 4. By scaling the radii $R_1$ and $R_2$, the slope can be altered.

FIG. 4 is a functional block diagram of a system according to the present invention for determining whether an aircraft is on a final approach to an airport without the use of a flap position signal. The system determines the distance of an aircraft from an airport, as modeled by a geometric shape, such as an inverted truncated cone, for the purpose of providing an indication that an aircraft is on a final approach to an airport without utilizing a flap position signal. The system according to the invention is illustrated as a series of functional blocks for the purpose of clarity. It is to be understood that the actual implementation of the system may be by various means.

A signal representative of the present latitude and longitude of the aircraft may be obtained from the aircraft on-board navigation system (not shown). These signals are applied on lines 12 and 14 to a local airport search routine block 16 and also to summing junctions 18 and 20, respectively. The function of the local airport search routine, block 16, is to provide the coordinates of the nearest airport to the aircraft and generate a signal representing circles of radii $R_1$ and $R_2$ for that airport. In general, this is done by comparing the current latitude and longitude of the aircraft with coordinates for the various airports stored on board the aircraft. Such a system is described in detail in U.S. Pat. No. 4,675,823 filed on Dec. 9, 1983, assigned to the same assignee as the assignee of the present invention, which is hereby incorporated by reference.

Signals representative of the latitude and longitude of the nearest airport are applied to the negative inputs of the summing junctions 18 and 20, respectively. The output of the summing junction 18 is a signal Y, which represents the distance between the current aircraft latitude and the latitude of the centerpoint of the nearest airport. The output of the summing junction 20 is a signal X, which represents the distance between the current aircraft longitude and the longitude of the centerpoint of the nearest airport. This distance could be corrected for errors induced by convergence of longitude as the aircraft altitude approaches the North or South Pole. This is accomplished by using a spherical to planar transformation 23, which converts differences in longitude to planar distance as a function of latitude. The signals X and Y are individually squared by devices represented by the function blocks 22 and 24 and added in the summing junction 26. The output of the summing junction 26 is a signal $D^2$, which represents the sum of the squares of the distances between the current aircraft longitude and latitude and the longitude and latitude of the nearest airport, respectively. The signal $D^2$ is applied to a square-root device 28. The output of the square-root device 28 is a signal D, which represents the square root of the sum of the squares of the distance between the current aircraft coordinates and the coordinates of the nearest airport. The signal D is applied to a positive input of a summing junction 30. A signal from the local airport search routine function block 16, which represents a circle of radius $R_1$ of the inverted truncated cone used to model the airport and the contiguous terrain, is applied to a negative input of the summing junction 30. The output signal from the summing junction 30 is a signal identified as $D-R_1$, which represents the distance between the aircraft and the circle having a radius $R_1$. The signal $D-R_1$ is applied to the divider 36. The signal $R_1$ is also applied to a negative input of a summing junction 32 along with a signal representative of a circle having a radius $R_2$, which is also obtained from the local airport search routine 16. The output of the summing junction 32 is a signal, $R_2-R_1$, which represents the distance between the radii $R_2$ and $R_1$. The signal $R_2-R_1$ is applied to the divider 36 and is divided into the signal $D-R_1$. Thus, as the aircraft approaches the airport, the divider 36 provides a signal that is constantly varying as a function of the aircraft's distance to the airport. The output of the divider 36 represents a signal as follows:

$$\frac{D - R_1}{R_2 - R_1}$$

where

D = the distance between the aircraft and the center coordinates of the nearest airport, $R_1$ = the radius of the smallest circular cross section of the cone immediately surrounding the airport, and $R_2$ = the radius of the largest circular cross section of the cone immediately surrounding the airport.

Accordingly, when D is less than or equal to $R_2$, the aircraft is assumed to be on a final approach. This signal can then be used for enabling various warning criteria. Also, as an aircraft overflies an airport, the envelope can also be used to represent that the aircraft is on a missed approach phase of flight. Moreover, the inventive system also solves a problem associated with some conventional systems which utilize a landing gear configuration signal as an indication that an aircraft is on a final approach. In certain aircraft, particularly tactical aircraft, the landing gear configuration does not change on a missed approach go-around phase of flight. Accordingly, in such aircraft, there would be no way of distinguishing between a final approach and a missed approach go-around phase of flight. The system in accordance with the present invention avoids this problem because it does not rely on flap or landing gear position signals.

The output signal from the divider 36 may be used with various ground proximity warning systems as a signal to indicate when an aircraft is on a final or missed approach phase of flight. As illustrated in FIGS. 3 and 4, the output signal from the divider 36 is shown as an input to a Mode 2 (Terrain Closure) and a Mode 4 (Terrain Clearance) warning system. However, the invention is not limited to such use. The system for determining when an aircraft is on a final or missed approach without using flap or landing gear position signals can be used in virtually any warning or control system where such a signal is required. When used in conjunction with a Mode 2 and Mode 4 warning system as shown, the output of the divider 36 is applied to a limiter 38 having a range of values between zero and one. The output signal from the limiter 38 is applied to the multipliers 40 for use with a Mode 2 warning system. The multiplier 40 multiplies the signal from the limiter 38 by a signal representative of 1250 feet of radio altitude. This signal is applied to a positive input of a summing junction 44 along with a biasing signal representative of 400 feet applied to another positive input of the summing junction 44 to provide an envelope in which a Mode 2 warning system is enabled. Since the output of the limiter 38 can vary between zero and one as a function of the distance that the aircraft is from the airport, the boundary of the enabling envelope, as represented by lines 4 and 6 in FIG. 3, varies between 400 and 1650 feet.

Similarly, the output of the limiter 38 may be applied to a multiplier device 42, which multiplies the signal from the limiter 38 by a signal representative of 500 feet of radio altitude when used with a Mode 4 warning system. Thus, it should be apparent that an apparatus has been disclosed which determines the distance of an aircraft from the nearest airport and provides a signal representating that an aircraft is on a final approach without using flap or landing gear position signals. This signal can then be used as an input to various warning and control systems requiring such signal.

In accordance with another important feature of the present invention, a system is disclosed for determining the alignment of the aircraft with a particular runway and altering the enabling envelope heretofor described as a function of the aircraft's alignment with a runway. This feature is illustrated in FIG. 5. The signals X, Y, which are longitudinal and latitudinal components, respectively, represent the distance of the aircraft from the airport. These signals X and Y are applied to a divider 46 (FIG. 5). The signals X and Y are obtained from the outputs of the summing junctions 18 and 20 (FIG. 4). The output quotient signal from the divider 46 is, in turn, applied to an absolute value device 47. The absolute value device 47 generates an output signal which is always positive. The output of the absolute value device 47 is applied to an arctan device 48, which provides a signal which is representative of the angle between a line segment connecting the present aircraft position and the centerpoint coordinates of the nearest airport and a reference datum. The output from the arctan device 48 is applied to a positive input of a summing junction 50. A signal, which represents the angle that the runway of interest makes with a datum, is applied over line 52 to a negative input of the summing junction 50. The output of the summing junction 50 is a signal representing the angular difference between the present relative position of the aircraft and the runway. In other words, the summing junction 50 provides a signal which is representative of the aircraft's alignment with the particular runway. This signal can, in turn, be used to allow the elongation of the radii $R_1$ and $R_2$ as a function of the alignment of the aircraft with a particular runway.

The elongation function is accomplished by the multipliers 56, 60 and 62, summing junction 58 and the absolute value device 54. When this feature is used in conjunction with a Mode 2 warning system, for example, as shown in FIG. 3, the effect is to vary the slope of line 4 as shown in FIG. 3. Generally speaking, the slope of the lines 4 is decreased when the aircraft is in alignment with a runway and increased when the aircraft is not in alignment with the runway.

In particular, the output of the summing junction 50 is applied to an absolute value device 54 which has heretofore been described as a device which will always provide a positive output signal. The output of the absolute value device 54 is applied to a multiplier 56. A scaling factor of 1/180 for the multiplier 56 is used. However, other scaling factors could also be used. The output signal from the multiplier 56 is applied to a negative input of a summing junction 58. A bias signal with a value of one is applied to a positive input of the summing junction 58. Since the arctan device 48 is preceded by an absolute value device 41, the output range of signals from the arctan device 48 will represent angles between a 0° and 90°. Consequently, the output signal from the multiplier 56 will be a signal that will vary between 0 and ½. The output signal from the summing junction 58 will thus result in a signal with a range of values between ½ and one. The output signal from the summing junction 58 is, in turn, applied to multipliers 60 and 62 for scaling the initial value of the radii $R_1$ and $R_2$.

If the aircraft is in alignment or close to being in alignment with a particular runway, the signal applied to the summing junction 58 will be either zero or close to zero. In this case, the output of the summing junction 58 will be a signal with a value of one. Accordingly, no scaling of the radii will result. Conversely, when the aircraft is 90° out of alignment with a runway, the output of the multiplier device 56 will be a signal with a value of ½. This will result in an output signal at the summing junction 58 with a value of ½. Thus, when an aircraft is out of alignment with a runway, the length of the radii $R_1$ and $R_2$ will be reduced resulting in larger slope of line 4 (FIG. 3). The larger slope results from the shorter distance between the 400 feet and 1650 feet points on the warning curve illustrated in FIG. 3.

The above described system can be utilized with a relatively small amount of additional on-board memory. The inverted truncated cone is defined by the latitude and longitude coordinates of the centerpoint thereof and by radii $R_1$ and $R_2$. Each of the longitude and the latitude coordinates for the cone can be stored in 16 bits each for a total of 32 bits. An additional 8 bits may be used to provide the capability of allowing $R_1$ and $R_2$ to be selectable. Thus, a total of 40 bits of memory would be required per airport. To store information for 4300 airports, 21.5 kilobytes of additional on-board memory is required for the above-described system. The size of the memory can be increased or decreased depending on the number of airports desired to be stored on-board the aircraft. As such, the system in accordance with the present invention does not require a burdensome and unreasonable amount of additional on-board memory.

Obviously, many modifications and variations of the present invention are possible in light of the above teachings. Thus, it is to be understood that, within the scope of the appended claims, the invention may be practiced otherwise than is specifically described above.

What is claimed and desired to be secured by a Letters Patent of the U.S. is:

1. A system for use in an aircraft for providing an enabling envelope for a ground proximity warning system for an aircraft comprising:
   a first source of signals representative of the longitude and latitude of an airport;
   a second source of signals representative of the current longitude and latitude of said aircraft;
   means responsive to said first source of signals representative of the longitude and latitude of said airport and said second source of signals representative of the current longitude and latitude of said aircraft for computing the distance of said aircraft from said airport and providing an enabling envelope for enabling the warning system as a function of said distance of the aircraft with respect to said airport;
   a source of signals representative of the relative angular position of a particular runway with respect to the heading of the aircraft; and
   means responsive to said first and second sources of signals for providing a signal representative of the alignment of the aircraft with the runway by determining the angle between the runway and the heading of the aircraft.

2. A warning system for use in an aircraft comprising:
   warning means for providing a ground proximity warning according to predetermined criteria;
   a first source of signals representative of the longitude and latitude of an aircraft;
   a second source of signals representative of the longitude and latitude of a predetermined geometric shape;
   means responsive to said first source of signals and said second source of signals for computing the distance between the aircraft and said predetermined geometric shape and for enabling the warning means as a function of the difference;
   a third source of signals representative of the relative angular position of a particular runway with respect to the heading of the aircraft; and
   means responsive to said first, second and third sources of signals for providing a signal representative of the alignment of the aircraft with the runway.

3. A system as recited in claim 2 wherein said radii $R_1$ and $R_2$ are altered as a function of the angular alignment of the aircraft with the runway.

4. A system for an aircraft comprising:
   warning means for providing a ground proximity warning when an aircraft encounters a hazardous flight condition;
   enabling means for enabling said warning means according to predetermined criteria;
   a first source of signals representative of the relative angular position of a predetermined runway at an airport nearest the aircraft with respect to the heading of the aircraft;
   a second source of signals representative of the longitude and latitude of the aircraft;
   a third source of signals representative of the longitude and latitude of the airport nearest the aircraft; and
   determining means responsive to said first source of signals, said second source of signals and said third source of signals for determining the aircraft's alignment with respect to said predetermined runway and altering said criteria for said enabling means as a function of the alignment of the aircraft with respect to said predetermined runway.

5. A system for an aircraft comprising:
   a first source of signals representative of the longitude and latitude of an aircraft;
   a second source of signals representative of the predetermined airport as modeled by a predetermined geometric shape;
   a third source of signals representative of the relative angular position of a predetermined runway at said predetermined airport with respect to the heading of the aircraft;
   means responsive to said first source of signals, said second source of signals, and said third source of signals for providing a distance signal representative of the distance between the aircraft and the nearest airport as modeled by said predetermined geometric shape and the alignment of the aircraft with said predetermined runway;
   warning means for providing a warning when an aircraft encounters a hazardous flight condition;
   enabling means responsive to said distance signal providing means for generating an enabling signal for enabling said warning means at a predetermined distance from said airport;
   first altering means for altering said enabling signal as a function of the distance of the aircraft from said nearest airport;
   a third source of signals representative of the heading of a predetermined runway at said nearest airport; and
   second altering means for altering said enabling signal as a function of the alignment of the aircraft with said runway.

* * * * *